United States Patent [19]

Edlinger et al.

[11] Patent Number: 6,010,553
[45] Date of Patent: Jan. 4, 2000

[54] PROCESS FOR PRODUCING PIG IRON, NONFERROUS HEAVY METAL ALLOYS, FECR AND SYNTHETIC BLAST FURNACE SLAGS USING METAL-OXIDE-CONTAINING WASTE INCINERATION RESIDUES OR SLAGS

[75] Inventors: Alfred Edlinger, Baden, Switzerland; Albert Waschnig, St. Stefan, Austria

[73] Assignee: "Holderbank" Financiere Glarus AG, Glarus, Switzerland

[21] Appl. No.: 08/913,702

[22] PCT Filed: Jan. 16, 1997

[86] PCT No.: PCT/AT97/00006

§ 371 Date: Sep. 16, 1997

§ 102(e) Date: Sep. 16, 1997

[87] PCT Pub. No.: WO97/26381

PCT Pub. Date: Jul. 24, 1997

[30] Foreign Application Priority Data

Jan. 17, 1996 [AT] Austria ..................................... A 79/96

[51] Int. Cl.[7] .................................................. C21B 13/14
[52] U.S. Cl. ............................. 75/434; 75/623; 75/585; 75/961; 420/590
[58] Field of Search ............................. 75/414, 434, 623, 75/585, 961; 420/590

[56] References Cited

U.S. PATENT DOCUMENTS 5,405,429  4/1995  Rey et al. ................................. 75/434
5,501,721  3/1996  Edlinger ................................... 75/434
5,535,234  7/1996  Bullmann .................................. 373/8
5,654,976  8/1997  Cowx et al. ........................... 75/10.63

FOREIGN PATENT DOCUMENTS 572 769    12/1993   European Pat. Off. .
670 188     9/1995   European Pat. Off. .
2 172 206   9/1973   France .
36 03 862   8/1987   Germany .
94/17214    8/1994   WIPO .
95/07365    3/1995   WIPO .
96/34989   11/1996   WIPO .

*Primary Examiner*—Melvyn Andrews
*Attorney, Agent, or Firm*—Pillsbury Madison & Sutro LLP

[57] ABSTRACT

In a process for producing pig iron, nonferrous heavy metal alloys, ferrochromium carbure or carbon-free ferrochromium and synthetic blast furnace slags, using metal-oxide-containing waste incineration residues or slags, the charging materials of waste burning, e.g., car shredder light fractions and/or metallurgical dusts, are at least partially oxidized and subsequently are reduced while separating nonferrous metals or alloys, whereupon the oxidic slag phase depleted from metals or alloys is mixed with liquid steelworks slag optionally upon further addition of metallurgical dusts, whereupon crude steel is drawn off while lowering the viscosity of the steelworks slag and the remaining slag portion is subjected to further reduction while recovering pig iron and optionally Fe chromium alloys, whereupon the resulting synthetic blast furnace slag is discharged.

19 Claims, 1 Drawing Sheet

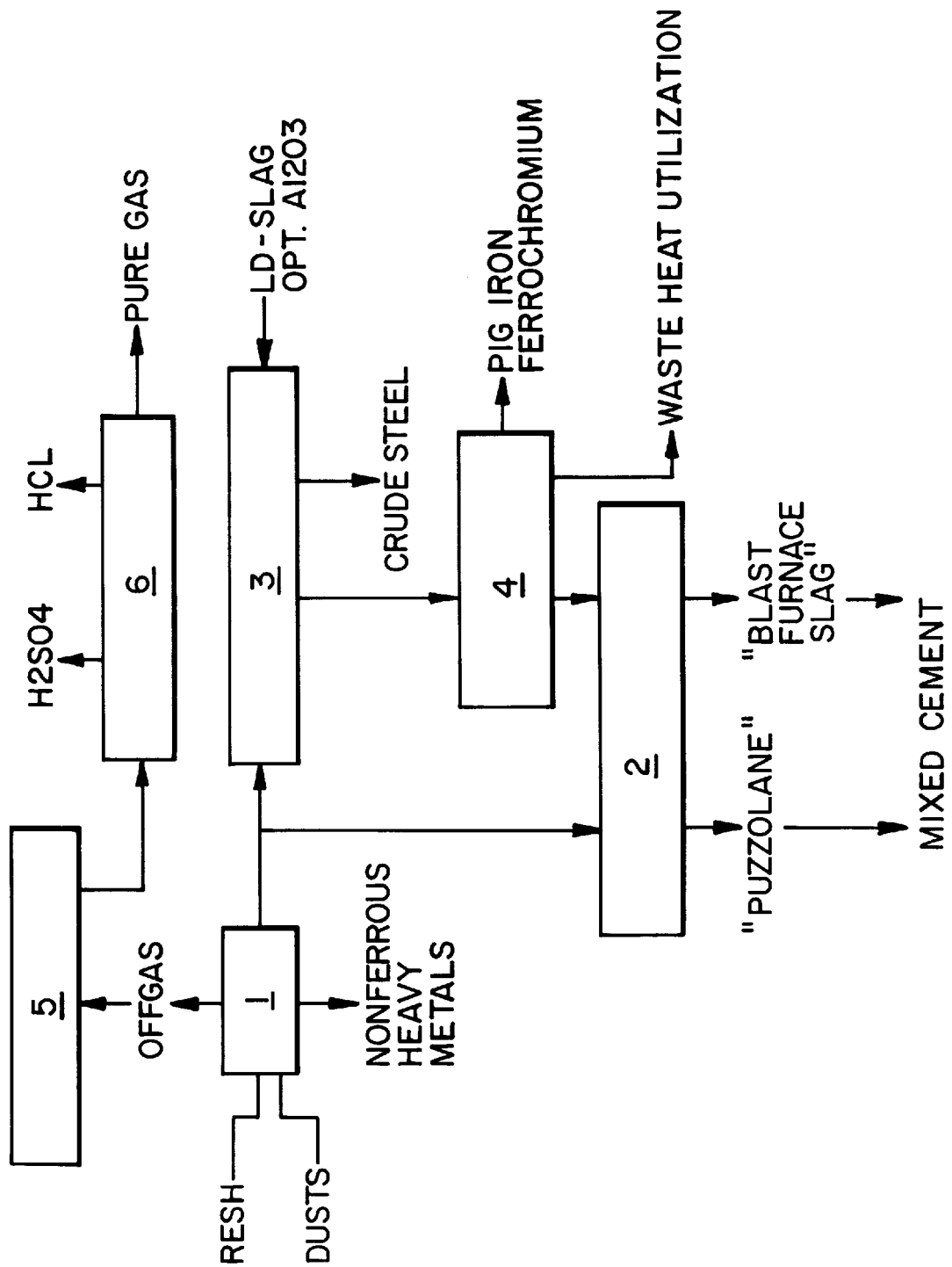

PROCESS FOR PRODUCING PIG IRON, NONFERROUS HEAVY METAL ALLOYS, FECR AND SYNTHETIC BLAST FURNACE SLAGS USING METAL-OXIDE-CONTAINING WASTE INCINERATION RESIDUES OR SLAGS

This application is the national phase of international application PCT/AT97/00006, filed Jan. 16, 1997 which designated the U.S.

FIELD OF THE INVENTION

The invention relates to a process for producing pig iron, nonferrous heavy metal alloys, ferrochromium carburé or carbon-free ferrochromium and synthetic blast furnace slags, using metal-oxide-containing waste incineration residues or slags.

BACKGROUND OF THE INVENTION

A number of process variants have been proposed for processing waste incineration residues, wherein it has already been proposed inter alia to aftertreat waste incineration residues as incur in the form of slags or the like upon largely complete oxidation, by multi-stage reduction with nonferrous heavy metals being recoverable. With hitherto known processes each phase that has been depleted from metals could be granulated and added to a cement as a puzzolane.

Also the use of blast furnace slag in the course of cement production has already been prior art. Blast furnace slag stands out for its latent hydraulic properties and consequently may be added to a mixed cement immediately after appropriate comminution or granulation. By appropriately treating blast furnace slag it is, however, also possible to directly aim at a defined cement quality, at least in terms of composition. Yet, in metallurgical operation also considerable amounts of steel slag incur, which are characterized by comparatively poor hydraulic properties. Therefore, such a steel slag, as a rule, calls for complex aftertreatment. The dumping of steel slag to an increasing extent gets problematic not least because of the chromium contents of such slags.

SUMMARY OF THE INVENTION

The invention aims at appropriately further processing and working up such steelworks slags within the scope of an overall process associated with a waste burning process such that directly usable products, such as, for instance, synthetic blast furnace slag, may be obtained, which in the following may be added, for instance, to a mixed cement.

To solve this object, the process according to the invention essentially consists in that the charging materials of waste burning, e.g., car shredder light fractions and/or metallurgical dusts, are at least partially oxidized and subsequently are reduced while separating nonferrous metals or alloys, whereupon the oxidic slag phase depleted from metals or alloys is mixed with liquid steelworks slag optionally upon further addition of metallurgical dusts, whereupon crude steel is drawn off while lowering the viscosity of the steelworks slag and the remaining slag portion is subjected to further reduction while recovering pig iron and optionally Fe chromium alloys, whereupon the resulting synthetic blast furnace slag is discharged. By the fact that the charging materials of waste burning, such as, e.g., car shredder light fractions, are oxidized at least partially, the prerequisite for separating nonferrous metals and nonferrous heavy metals is at first created. In this manner, an oxidic iron-oxide-containing slag phase depleted from such metals or alloys is formed, and due to the fact that this slag phase is mixed with liquid steelworks slag optionally upon the addition of metallurgical dusts that are equally difficult to dispose of, the possibility to considerably lower the viscosity of steel slag, on the one hand, and the prerequisite to reduce and separate from such steel slags the relatively high iron-oxide portion in a relatively simple manner, on the other hand, are created. An essential prerequisite for this is the inital lowering of the viscosity as rendered feasible by mixing with the oxidic slag phase derived from waste burning. Such a low-viscous slag containing high amounts of iron oxides in the following may readily be subjected to further reduction while obtaining pig iron and optionally iron chromium alloys, wherein a synthetic blast furnace slag is formed directly from the steel slag, which is relatively difficult to process in the beginning. The synthetic blast furnace slag is characterized by a substantially lower iron oxide content and no toxic heavy metals, the recovery in the form of pig iron of the iron amount contained in the steelworks or LD slag substantially improving the economy of the process.

BRIEF DESCRIPTION OF THE DRAWINGS

FIG. 1 is a schematic representation of a process according to the invention.

DETAILED DESCRIPTION OF THE INVENTION

In a particularly advantageous manner, the process according to the invention may be carried out in a bottom-blowing converter, thus improving the thermal balance. For instance, if carbon and oxygen are introduced into a converter of this type, a suitable amount of carbon monoxide will be formed, which may be afterburnt in the following.

In order to ensure that the metals to be discharged separately, i.e., chromium, manganese and/or vanadium, will remain in the slag during a first reduction and will not be dissolved into pig iron, the process according to the invention advantageously is realized in a manner that a first reduction is effected until an FeO content of the slag of more than 1% by weight, preferably more than 2% by weight and less than 5% by weight, and that a second reduction with reductants other than C, such as, e.g., Al, is effected to separate Cr, Mn and/or V. In doing so, an iron oxide content of the slag of more than 1% by weight and preferably more than 2% by weight ensures that chromium, manganese and/or vanadium are separated only during the subsequent reduction. The use of reductants other than carbon, such as, e.g., aluminum, results, for instance, in carbon-free ferrochromium and valuable alloys in which a low carbon content is beneficial.

A preferred use of the synthetic blast furnace slag as may be formed by the process according to the invention consists in that the synthetic blast furnace slag is granulated and together with granulated puzzolanic slag from waste burning is used as a mixed cement.

In order to facilitate the required lowering of the viscosity and hence the discharging of crude steel from the slag mixture, the process advantageously is realized in a manner that the oxidic slag phase derived from waste burning and depleted from nonferrous metals or alloys is mixed with steelworks slag or LD slag at a weight ratio ranging between 30 to 70 and 50 to 50.

The reduction, like the lowering of the viscosity, is promoted by acidification, it being advantageously proceeded in a manner that $Al_2O_3$ is admixed to the steelworks slag or LD slag prior to or during mixing with waste incineration slag. Another essential advantage of admixing $Al_2O_3$ resides in the drastically extended service life of the lining. The refractory lining of converters usually is comprised of magnesite. $Al_2O_3$ reacts with magnesite to form $MgAl_2O_4$. Such a magnesium oxide spinel forms an extremely good refractory protection at the boundary face. Thus, the refractory lining together with the slag provides for corrosion resistance with enhanced refractory protection which improve during operation.

Advantageously, the process according to the invention is carried out in a manner that $Al_2O_3$ is added to the slag in amounts of from 10 to 25% by weight, based on the reduced slag. Such an assessment of the amount of $Al_2O_3$ added will result in a significantly increased early strength of a mixed cement subsequently obtained.

Working up of the waste burning slag may be effected according to known methods. Yet, within the scope of the process according to the present invention, this process advantageously is carried out in a manner that the separation of the metals or alloys from the waste incineration slag takes place in a two-stage reduction above a metal bath. In order to ensure that in addition to a car shredder light fraction also remarkable amounts of metallurgical dusts may be disposed of from the steelmaking plant along with LD slag, while observing the conditions required in respect of the lowering of the viscosity and the subsequent reduction with a view to separating crude steel it is proceeded in a manner that the burning of waste is effected using shredder light fractions and metallurgical or waste incineration dusts at weight ratios ranging between 0.7 to 1.5 and 2.

In principle, the process according to the invention may be carried out using a separate mixing means for the slag or directly within a converter. Advantageously, it is proceeded in a manner that mixing of the slags is effected in a bottom-blowing converter with the CO formed being afterburnt in the waste incineration plant, in particular within a meltdown oxidation reactor. A partial amount from waste burning may each be granulated at once and worked up to puzzolanic materials. Such puzzolanic end products after granulation may be united with synthetic blast furnace slag to form a mixed cement, the desired quality of the mixed cement thus being adjustable within wide limits also in that case.

When processing a shredder light fraction, portions of the heavy metals contained in that fraction in a meltdown oxidation reactor may volatilize in the form of chlorides, sulfur compounds or oxides such that the offgases will have to be subjected to appropriate purification.

When mixing the slags from waste burning and from an LD steel process at a quantitative ratio of approximately 1 to 1, the crude steel is immediately sedimented out of the LD slag, approximately 200 kg/ton mixed slag of crude steel being formed. The reduction potential desired in each case may be adjusted by aid of carbon, oxygen and aluminum. The CO formed in the reduction of the slag mixture may also be introduced into the mixing reactor so as to be able to safely maintain a liquid slag mixture within the same without any additional energy input. Large quantities of waste heat incur at high temperature levels, wherein in the course of the process according to the invention excess amounts of heat may be converted into electric energy or used for slag drying. Thus, an essential aspect of the process control according to the invention, in addition to using car shredder light fractions, resides in the relatively simple disposal of metallurgical dusts as well as the conversion of steel slags, in particular, in the liquid form, to usable end products, such as, for instance, synthetic blast furnace slag.

The CO formed in a bottom-blowing converter, as a rule, may be afterburnt by at least 30%, the heat transfer coefficient ranging at at least 85%. The remaining combustion advantageously may be effected in the meltdown oxidation reactor of the first stage, in which the burning of waste takes place, a separate slag mixer thus being obviated.

At the same time, appropriate upgrading and adjusting may be effected by the process according to the invention even if, for instance, the phosphorus content in the slag and in the steel are too high. Advantageously, it is proceeded in a manner that the slag is covered with CaO or CaO is blown in during oxidation or during the addition of steelworks dusts and/or the reduction of the slag to FeO contents of larger than 1% by weight, whereupon the Thomas meal or the apatite formed is discharged. By this mode of operation it is ensured that phosphorus is oxidized, reacting with the lime batch to form phosphates. If desired, zinc and lead may be separated from the hot gases during such oxidation, wherein, in particular with iron oxide contents of the slag being kept larger than 1 to 2% by weight, phosphorus is reacted out of the pig iron and chromium, manganese and vanadium remain in the slag.

Taking into consideration the plurality of reduction stages, the process in each individual phase may be realized in a manner that chromium is safely reduced and discharged as ferrochromium such that, on the whole, a substantially purer end product will be obtained than with known processes.

In the following the invention will be explained in more detail by way of a flow chart represented in FIG. 1. In FIG. 1, shredder light fraction is supplied to a melter gasifier 1. Metallurgical dusts are introduced along with shredder light fraction. Nonferrous heavy metals are discharged from the melting gasifying reactor, a portion of the slag being conducted to a granulator 2, thus immediately forming puzzolanic materials.

The slag from the melting gasifying reactor of the waste incineration plant is supplied to a slag mixing means 3. Alternatively, it may be directly charged into a reduction converter 4, intensive thorough mixing being feasible by appropriate gas control within the reduction converter. Because of the viscosity having been lowered, crude steel may be withdrawn from the slag mixer 3 to which steelworks slag, in particular LD slag, is added along with $Al_2O_3$. The separation of crude steel may, of course, be effected also within the reduction converter, wherein in that case carbon-free ferrochromium may be formed, for instance, by adding aluminum. Moreover, pig iron may be drawn off the reduction converter.

The waste heat from the melting gasifying reactor 1 of the waste incineration plant may be subjected to waste heat utilization 5 followed by offgas purification 6. In the purification of offgases, products like $H_2SO_4$ and HCl may, for instance, be recovered depending on the purification technique employed.

The utilization of waste heat for the offgases from the reduction converter 4, in principle, may be run analogously, wherein cumbersome purification may be dropped as a rule. The slag formed in the reduction converter 4 may be denoted as synthetic blast furnace slag and likewise be supplied to the granulator 2. The granulated blast furnace slag together with the granulated puzzolanic materials may be used as a mixed cement.

We claim:

1. A process for producing pig iron, nonferrous heavy metal alloys, ferrochromium carbure or carbon-free ferrochromium and synthetic blast furnace slags, using metal-oxide-containing waste incineration residues or slags, said process comprising:

(a) reducing charging materials comprising metal-oxide-containing waste incineration residues or metal-oxide-containing slags and separating nonferrous metals and/or alloys from the charging materials to form a slag phase which is depleted from the nonferrous metals and/or alloys;

(b) mixing the slag phase with liquid steelworks slag containing chromium oxides, and optionally further mixing the slag phase with metallurgical dusts and LD slag, to form a crude-steel-containing slag comprising a crude steel portion;

(c) removing the crude steel portion from the crude-steel-containing slag to thereby provide a remaining slag portion having a lower viscosity than the slag phase;

(d) reducing the remaining slag portion to provide pig iron and synthetic blast furnace slag, and recovering the pig iron; and (e) discharging the synthetic blast furnace slag.

2. The process of claim 1, wherein the slag phase formed during said reducing (a) of the charging materials has FeO present in a content of more than 1% by weight.

3. The process of claim 1, further comprising (f) granulating the synthetic blast furnace slag to form granulated synthetic blast furnace slag and mixing the granulated synthetic blast furnace slag with granulated puzzolanic slag from waste burning to form a mixed cement.

4. The process of claim 1, wherein a weight ratio of the slag phase to the LD slag during said mixing (b) is between 30:70 and 50:50.

5. The process of claim 1, further comprising mixing $Al_2O_3$ with the steelworks slag prior to said mixing (b) or with the steel slag during said mixing (b).

6. The process of claim 5, wherein the $Al_2O_3$ is added in an amount ranging from 10% by weight to 25% by weight, based on the crude-steel-containing slag.

7. The process of claim 1, wherein said separating of nonferrous metals and/or alloys from the charging materials comprises a two-stage reduction process performed above a metal bath.

8. The process of claim 1, wherein a weight ratio of shredder light fractions to metallurgical or waste incineration dusts in the charging materials is in a range of from 0.7:1.5 to 0.7:2.

9. The process of claim 1, wherein said mixing (b) is effected in a bottom-blowing converter.

10. The process of claim 1, wherein said mixing (b) further comprises covering the slag with CaO.

11. The process of claim 1, wherein said mixing (b) includes mixing the metallurgical dusts.

12. The process of claim 1, wherein the pig iron of said recovering (d) of the pig iron includes Fe chromium alloys.

13. The process of claim 2, wherein the FeO is present in the slag phase in a content of between 2% by weight and 5% by weight.

14. The process of claim 2, wherein the remaining slag portion includes Cr, Mn and/or V, and wherein said reducing (d) comprises introducing a reductant into the remaining slag portion to separate Cr, Mn and/or V.

15. The process of claim 14 wherein the reductant is Al.

16. The process of claim 9, wherein CO is formed in the bottom-blowing converter, and wherein said process further comprising afterburning CO.

17. The process of claim 16, wherein said afterburning is conducted in a meltdown oxidation reactor.

18. The process of claim 1, wherein said mixing (b) further comprising blowing in CaO.

19. The process of claim 10, or 18, wherein the FeO is present in the slag phase in a content greater than 1% by weight.

* * * * *